United States Patent
Bohn (10) Patent No.: US 9,654,257 B2
(45) Date of Patent: May 16, 2017

(54) TIME EFFICIENT GROUP DATA ACKNOWLEDGEMENT

(71) Applicant: MOTOROLA SOLUTIONS, INC, Schaumburg, IL (US)

(72) Inventor: Thomas B Bohn, Mc Henry, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 167 days.

(21) Appl. No.: 14/605,143

(22) Filed: Jan. 26, 2015

(65) Prior Publication Data

US 2016/0218834 A1    Jul. 28, 2016

(51) Int. Cl.
| | | |
|---|---|---|
| *H04L 1/16* | (2006.01) | |
| *H04W 56/00* | (2009.01) | |
| *H04W 72/04* | (2009.01) | |
| *H04W 72/12* | (2009.01) | |

(52) U.S. Cl.
CPC ....... *H04L 1/1635* (2013.01); *H04W 56/0015* (2013.01); *H04W 72/0446* (2013.01); *H04W 72/1289* (2013.01)

(58) Field of Classification Search
CPC ............ H04L 1/1635; H04W 56/0015; H04W 72/0446; H04W 72/1289
See application file for complete search history.

(56) References Cited

U.S. PATENT DOCUMENTS

| | | | |
|---|---|---|---|
| 7,203,207 B2 | 4/2007 | Hiben et al. | |
| 8,279,991 B2 | 4/2007 | Hiben et al. | |
| 7,512,086 B2 | 3/2009 | Choi et al. | |
| 7,817,609 B2 | 10/2010 | Law et al. | |
| 8,306,071 B2 | 11/2012 | Hiben et al. | |
| 8,379,547 B2 | 2/2013 | Hu et al. | |
| 8,649,316 B2 | 2/2014 | Seo et al. | |
| 8,699,411 B1 | 4/2014 | Gossett et al. | |
| 8,743,864 B2 | 6/2014 | Pietsch et al. | |
| 2003/0039270 A1* | 2/2003 | Chang ................... | H04L 1/1671 370/469 |
| 2010/0254392 A1* | 10/2010 | Katar ................... | H04L 12/1868 370/400 |
| 2012/0195265 A1 | 8/2012 | Kim et al. | |
| 2013/0100942 A1 | 4/2013 | Rudnick et al. | |
| 2013/0322414 A1* | 12/2013 | Chowdhary ............ | H04W 4/08 370/337 |
| 2014/0308038 A1* | 10/2014 | Zheng ................ | H04Q 11/0067 398/68 |

(Continued)

FOREIGN PATENT DOCUMENTS

WO    2014095862 A1    6/2014

*Primary Examiner* — Ajay Cattungal
(74) *Attorney, Agent, or Firm* — Daniel R. Bestor (57) ABSTRACT

A method and apparatus for time-efficient confirmed group data acknowledgement includes a radio subscriber unit (SU) configured to (i) generate a receive status message comprising a first synchronization pattern indicating successful receipt of a set of data blocks when the SU has successfully received the set of data blocks from a base radio, (ii) generate a receive status message comprising a second synchronization pattern indicating unsuccessful receipt of a set of data blocks when the SU has not successfully received the set of data blocks from the base radio, and (iii) transmit the generated receive status message from the SU to the base radio during an uplink transmit time interval assigned by the base radio.

14 Claims, 6 Drawing Sheets

(56) References Cited

U.S. PATENT DOCUMENTS

| | | | | |
|---|---|---|---|---|
| 2015/0229444 A1* | 8/2015 | Webb | ................. | H04L 1/08 370/329 |
| 2016/0066222 A1* | 3/2016 | Makinen | ............ | H04W 74/006 370/331 |
| 2016/0119948 A1* | 4/2016 | Damnjanovic | ....... | H04L 1/1812 370/280 |

* cited by examiner

TIME EFFICIENT GROUP DATA ACKNOWLEDGEMENT

BACKGROUND OF THE INVENTION

Some wireless communications systems can be configured to logically group sets of mobile wireless radio subscriber units (SUs) into subgroups, sometimes known as talk groups. A talk group includes multiple SUs that are able to participate in a group or dispatch voice call, where all of the SUs in the talk group receive the same voice information, thereby allowing one member of the talk group (or perhaps a dispatcher at a head end location) to talk to every other member of the talk group at substantially the same time over a single shared downlink connection from a base radio.

Some wireless communication systems also support the transmission of group data (in addition to group voice) to all SUs in the talk group. In operation, all of the SUs in the talk group typically receive group data on a single shared downlink connection from the base radio. Examples of group data that SUs in a talk group might receive on the shared downlink connection from the base radio include text messages, file downloads, SU firmware/software updates, SU configuration parameter settings, access/encryption keys, talk group configuration and/or management parameters, and the like.

Most wireless communications systems that allow SUs in a talk group to receive group data messages typically support only unconfirmed delivery of the group data by the SUs in the talk group. Unconfirmed delivery is when the base radio sends the group data to the SUs in the talk group, but the SUs of the talk group do not inform the base radio as to whether they successfully received the group data transmission or not. The primary reasons why most wireless communications systems support only unconfirmed delivery of group data is because (i) existing methods of sending confirmation messages from each SU to the base radio use a lot of radio frequency (RF) resources in the shared wireless network, (ii) for talk groups with a lot of SUs, existing methods of sending confirmation messages from each SU to the base radio take a lot of time especially over lower speed communication channels, and (iii) it is often unnecessary for individual SUs to send receipt confirmations to the base radio if higher layer protocols handle confirmations and retransmission requests (e.g., Transmission Control Protocol (TCP) between the source application and the receiver, or perhaps even higher application layer protocols).

However, in some situations, it is desirable to have the ability to quickly confirm whether all the SUs in a talk group have received a particular group data transmission. One such application is where a large team of operational and/or technical personnel need to receive the same information (e.g., system alarms, security/access codes, text messages, system status updates) very quickly and accurately to coordinate their activities in a large-scale, mission-critical manufacturing, production, communications, and/or police/military operation. In such applications, existing methods of having each SU in the talk group send a confirmation to the base radio and existing methods of using Layer 4 (e.g., TCP) or higher (e.g., application layer) confirmation and retransmission mechanisms may not provide sufficiently fast delivery confirmations, particularly in talk groups having a very large number of SUs communicating over lower speed transmission channels.

Accordingly, there is a need for an improved, bandwidth efficient and time efficient, group data acknowledgement to confirm successful delivery of group data to all SUs in a talk group.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are systems and methods of bandwidth efficient and time efficient group data acknowledgement to confirm successful delivery of group data to all SUs in a talk group. Some embodiments include an SU configured to: (i) receive a set of one or more data blocks from a base radio; (ii) determine whether the SU has successfully received each and every one of the set of one or more data blocks from the base radio; (iii) receive an indication of a designated uplink transmit time interval (TTI) from the base radio during which the SU is scheduled to transmit a receive status message to the base radio; (iv) in response to determining that the SU has successfully received every data block in the set of the one or more data blocks from the base radio, generate a receive status message comprising a first synchronization pattern indicating that the SU successfully received every data block in the set of the one or more data blocks from the base radio; and (v) transmit the generated receive status message to the base radio during the designated uplink TTI.

In another embodiment, a radio SU comprises: one or more wireless communications interfaces configured to receive (i) a set of one or more data blocks from a base radio and (ii) an indication of a designated uplink transmit time interval (TTI) during which the SU is scheduled to transmit a receive status message to the base radio, and one or more processors configured to (i) determine whether the SU has successfully received each of the one or more data blocks and (ii) in response to determining that the SU has successfully received each of the one or more data blocks, generate a receive status message comprising a first synchronization pattern indicating that the SU successfully received each data block in the set of the one or more data blocks, wherein the one or more wireless communications interfaces are further configured to transmit the generated receive status message to the base radio during the designated uplink TTI.

Figure 1:
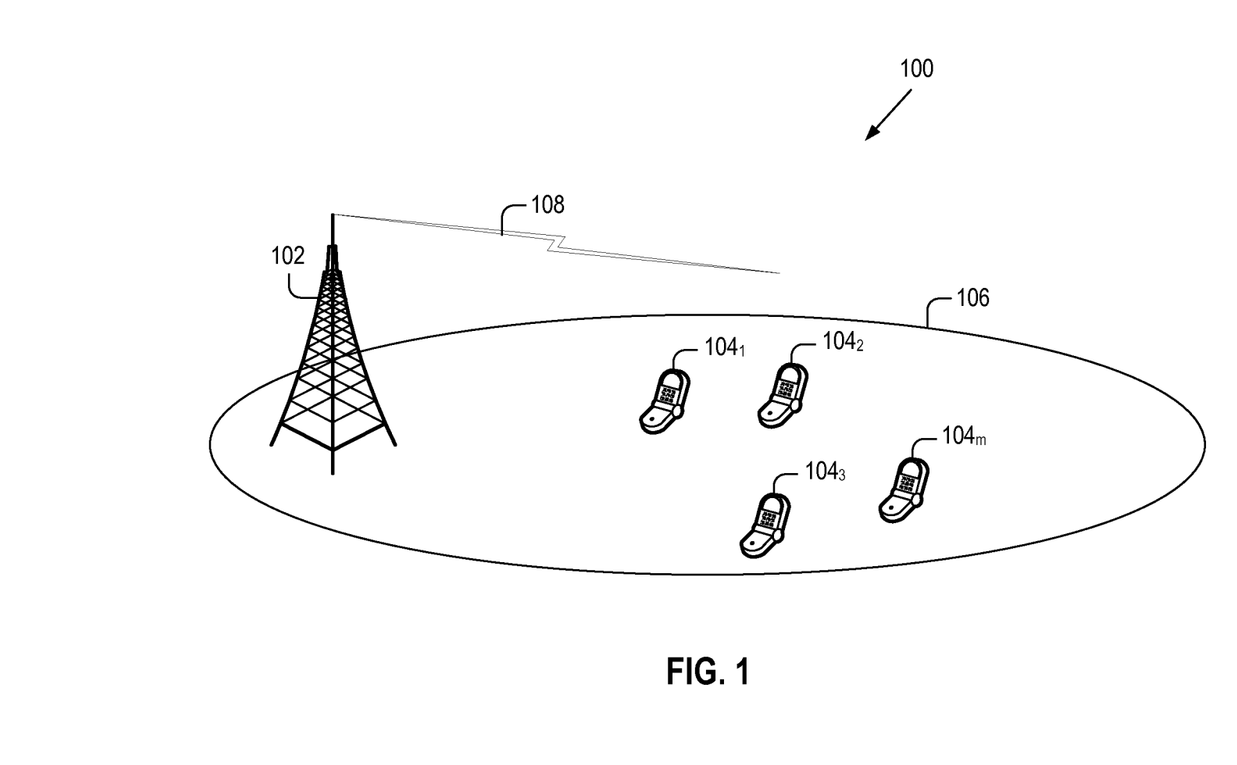
FIG. 1 is a simplified block diagram of a wireless communications network configured for operation in accordance with some embodiments.

FIG. 1 is a simplified block diagram of an example wireless communications network 100 configured for operation in accordance with some embodiments. Wireless communications network 100 includes a base radio 102 configured to provide wireless communications service to multiple radio subscriber units (SUs) $104_1$-$104_m$ within wireless communications coverage area 106 via a shared wireless communications channel 108.

The shared wireless communications channel 108 includes communication resources, e.g., radio frequency (RF) resources, such as time division multiple access (TDMA) timeslots over which information is sent between the base radio 102 and the SUs $104_1$-$104_m$ in the wireless communication network 100. In some embodiments, the wireless network 100 may be configured to operate according to the European Telecommunications Standard Institute (ETSI) Digital Mobile Radio (DMR) standard and related protocols. However, in other embodiments, the wireless network may operate according to any multiple access technology, including but not limited to other TDMA-based schemes, Frequency Division Multiple Access (FDMA), Code Division Multiple Access (CDMA), other multiple access technologies, and/or perhaps combinations of the above-listed multiple access technologies.

The SUs $104_1$-$104_m$ may be any type of wireless access terminal, mobile radio, mobile station, wireless communication device, user equipment, mobile device, or any other device capable of wireless communication over the shared communications channel 108 according to the multiple access protocol(s) of wireless communications network 100. Example SUs include, but are not limited to, two-way radios, mobile phones, cellular phones, personal digital assistants, laptops, and pagers.

Each of the SUs $104_1$-$104_m$ shown in wireless communications network 100 is a member of the same talk group. A talk group is a group of SUs configured to communicate group data with each other and the base radio 102 over the shared communication channel 108. Group data refers to data that is sent over the shared communications channel 108 to all SUs within the talk group. Group data includes, but is not limited to (i) user data (e.g., text messages, system alarms, and file transfers), (ii) SU control/management data (e.g., SU firmware, SU configuration parameters, and security/access keys), and (iii) other SU and/or talk group management messages and configuration parameters. In operation, a talk group may include as little as a few (e.g., <10) up to many tens or perhaps hundreds of SUs.

The base radio 102 may be any type of network infrastructure device capable of sending information to/from multiple SUs according to the multiple access protocol(s) of the wireless communications network 100. For example, the base radio 102 may include one or more base stations, base transceiver stations, access points, routers, servers, repeaters, or other types of infrastructure equipment configured for sending and receiving transmissions in a wireless network such as wireless communications network 100.

In some embodiments, the base radio 102 may additionally include (or at least communicate with) a radio application server/console (not shown) configured to manage various aspects of the wireless communications network 100, including but not limited to operational aspects of the base radio 102 and the SUs $104_1$-$104_m$. In such embodiments, the base radio 102 (alone or in combination with an integrated or attached application server/console) monitors the success or failure of the delivery of group data to the plurality of SUs $104_1$-$104_m$. For example, the base radio 102 may be configured to confirm delivery of group data to the SUs $104_1$-$104_m$ and/or track the success or failure of the delivery of the group data to the SUs $104_1$-$104_m$ based on acknowledgement (ACK) and non-acknowledgement (NACK) messages that the SUs in the talk group transmit to the base radio 102, as described herein.

Figure 2:
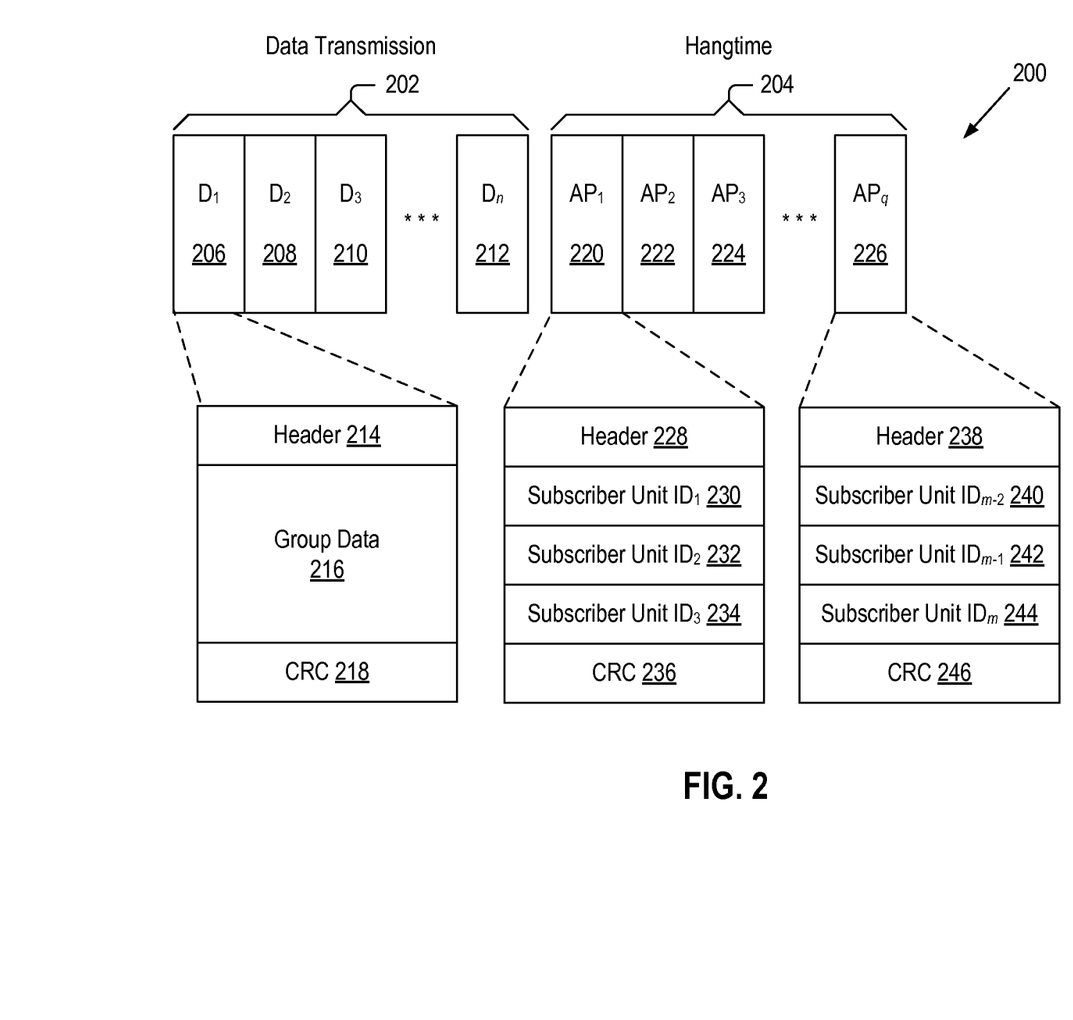
FIG. 2 is a simplified diagram of a transmission flow from a base radio to a plurality of radio subscriber units in a talk group in accordance with some embodiments.

FIG. 2 is a simplified diagram of a transmission flow 200 from a base radio to a plurality of SUs in a talk group in accordance with some embodiments. The example transmission flow 200 includes a data transmission period 202 followed by a hangtime period 204. In operation, the base radio that transmits the flow 200 may be the same as or similar to any of the base radios described herein, including base radio 102, shown and described with reference to FIG. 1. Similarly, the SUs in the talk group that receive the flow 200 may be the same as or similar to any of the SUs described herein, including but not limited to SUs $104_1$-$104_m$ shown and described with reference to FIG. 1.

During the data transmission period 202, the base radio transmits a plurality of data blocks 206-212 to all of the SUs in the talk group over a shared communications channel. The shared communications channel may be the same as or similar to the shared communications channel 108 shown and described with reference to FIG. 1. In some embodiments, each data block is a 30-millisecond transmission (or 30-millisecond timeslot) that corresponds to or includes approximately 288 bits of data at a 9.6 Kbps transmission rate. In other embodiments, each data block may include more or fewer bits of data at correspondingly higher or lower transmission rates. In operation, the base radio may transmit many tens or hundreds (or perhaps more) of data blocks during the data transmission period 202.

In some embodiments, an individual data block, such as data block 206, includes one or more of (i) a header field 214, (ii) a group data field 216, and (iii) a block cyclic redundancy check (CRC) field 218.

The header field 214 may include one or more of (i) a talk group identifier to identify the talk group to which the data block is addressed, (ii) a data block sequence number that indicates the order in which the block was transmitted, and/or (iii) other overhead information. In some embodiments, the data block may be encoded according to an error-correcting code, and in such embodiments, the header may additionally include data for use by SUs to detect and potentially correct errors in the transmission of the data blocks from the base radio to the SUs.

The group data field 216 may include one or more of (i) user data (e.g., text messages, system alarms, file transfers) and/or (ii) SU, talk group, or wireless network control data (e.g., signaling to join/leave a talk group, SU configuration information, talk group configuration information).

The block CRC field 218 of an individual data block includes bits corresponding to error-detecting code. In some embodiments, an individual SU uses the CRC code in the block CRC field 218 of an individual data block to determine whether the SU has received the data block without transmission errors. In some embodiments, each SU in the talk group performs a CRC analysis on each data block received from the base radio during the data transmission period 202. Because each SU in the talk group performs a CRC analysis on each data block received, each SU is able to determine, at the end of the data transmission period 202, whether it received each and every data block during transmission period 202 without transmission error(s). In some embodiments, the transmissions from the base radio during the data transmission period 202 may also include a message CRC (not shown) that the SUs in the talk group can additionally or alternatively use to determine whether they received the each and every data block of the group data transmitted during the transmission period 202.

After the data transmission period 202, the base radio begins the hangtime period 204. During the hangtime period 204, the base radio transmits a plurality of acknowledgement polls 220-226 to all of the SUs in the talk group. In some embodiments, each acknowledgement poll is a 30-millisecond transmission (or timeslot) that corresponds to or includes approximately 288 bits of data at a 9.6 Kbps transmission rate. In other embodiments, each data block may include more or fewer bits of data at correspondingly higher or lower transmission rates.

Each acknowledgement poll includes one or more indications of one or more uplink transmit time intervals (TTIs) during which one or more corresponding SUs are scheduled to transmit a receive status message (FIG. 3) to the base radio to inform the base radio whether the SU received all of the data blocks (that the base radio transmitted during data transmission period 202) without error. In operation, the receive status message that an individual SU sends to the base radio during its designated TTI is either (i) an ACK message to inform the base radio that the SU successfully received all of the data blocks transmitted by the base radio during the data transmission period 202 or (ii) a NACK message to inform the base radio that the SU did not successfully receive all of the data blocks transmitted by the base radio during the data transmission period 202.

In the example shown in FIG. 2, acknowledgement poll 220 includes (i) a first indication 230 of a first TTI during which a first SU (i.e., $SU_1$) is scheduled to transmit a receive status message (an ACK or NACK) to the base radio; (ii) a second indication 232 of a second TTI during which a second SU ($SU_2$) is scheduled to transmit a receive status message (an ACK or NACK) to the base radio; and (iii) a third indication 234 of a third TTI during which a third SU ($SU_3$) is scheduled to transmit a receive status message (an ACK or NACK) to the base radio. Similarly, acknowledgement poll 226 includes (i) an indication 240 of a TTI during which $SU_{m-2}$ is scheduled to transmit a receive status message to the base radio; (ii) an indication 242 of a TTI during which $SU_{m-1}$ is scheduled to transmit a receive status message to the base radio; and (iii) an indication 244 of a TTI during which $SU_m$ is scheduled to transmit a receive status message to the base radio.

In some embodiments, each uplink TTI indicated in an acknowledgement poll message corresponds to one of a plurality of microslots within a larger uplink timeslot. As described earlier, downlink transmissions from the base radio to the SUs are arranged in 30-millisecond timeslots that include up to 288 bits of data at a 9.6 Kbps data rate. In some embodiments, uplink transmissions from SUs to the base radio are also arranged in 30-millisecond timeslots that include up to 288 bits of data at a 9.6 Kbps data rate. In some embodiments, each acknowledgement poll message may instruct three separate SUs to transmit their respective receive status messages during the same 30-millisecond timeslot on the uplink to the base radio, but during three different microslots within the 30-millisecond uplink timeslot.

In such embodiments, each TTI in an acknowledgement poll message corresponds to one microslot within a larger uplink timeslot. For example, in acknowledgement poll 220, (i) the first TTI indicated in field 230 instructs the first SU ($SU_1$) to transmit its receive status message to the base radio during the first microslot of an uplink timeslot, (ii) the second TTI indicated in field 232 instructs the second SU ($SU_2$) to transmit its receive status message to the base radio during the second microslot of the uplink timeslot, and (iii) the third TTI indicated in field 234 instructs the third SU ($SU_3$) to transmit its receive status message to the base radio during the third microslot of the uplink timeslot. Similarly, in acknowledgement poll 226, (i) the TTI indicated in field 240 instructs the $SU_{m-2}$ to transmit its receive status message to the base radio during the first microslot of an uplink timeslot, (ii) the TTI indicated in field 242 instructs the $SU_{m-1}$ to transmit its receive status message to the base radio during the second microslot of the uplink timeslot, and (iii) the TTI indicated in field 244 instructs the $SU_m$ to transmit its receive status message to the base radio during the third microslot of an uplink timeslot. It will be readily appreciated that the uplink timeslot (and thus the TTIs indicated in fields 230, 232, and 234) for $SU_1$, $SU_2$, and $SU_3$ of acknowledgment poll 220 is a different uplink timeslot than the uplink timeslot (and thus the TTIs indicated in fields 240, 242, and 244) for $SU_{m-2}$, $SU_{m-1}$, and $SU_m$ indicated in acknowledgement poll 226.

Each acknowledgment poll may also include a header field and a block CRC field. For example, acknowledgement poll 220 also includes a header field 228 that may include a talk group identifier to identify the talk group to which the acknowledgement poll is addressed and/or perhaps other overhead information. Similarly, acknowledgement poll 226 also includes a header field 238 that may include the talk group identifier to identify the talk group to which the acknowledgement poll is addressed and/or perhaps other overhead information.

The block CRC field of each acknowledgement poll includes bits corresponding to error-detecting code so that each SU in the talk group that receives an acknowledgement poll can determine whether it received that particular acknowledgement poll without error. For example, acknowledgement poll 220 includes block CRC field 236 that includes error-detecting code that SUs in the talk group can use to determine whether they received acknowledgement poll 220 without error, and acknowledgment poll 226 includes block CRC field 248 that includes error-detecting code that SUs in the talk group can use to determine whether they received acknowledgment poll 226 without error.

In operation, the base radio sends enough acknowledgement polls during the hangtime period 204 so that each SU in the talk group receives its own indication of a corresponding TTI during which that SU is scheduled to send its own receive status message to the base radio. In the example embodiment shown in FIG. 2, each acknowledgement poll includes three such indications. Thus, for a talk group that includes 90 SUs for example, the base radio only needs to send 30 acknowledgement poll messages to poll all 90 SUs because each acknowledgement poll message in effect polls three separate SUs. As a result, the acknowledgement polling method described herein is substantially faster (up to 3-times faster) than polling methods where the base radio polls each SU in a talk group with a separate, 30-millisecond acknowledgement poll message.

Figure 3:
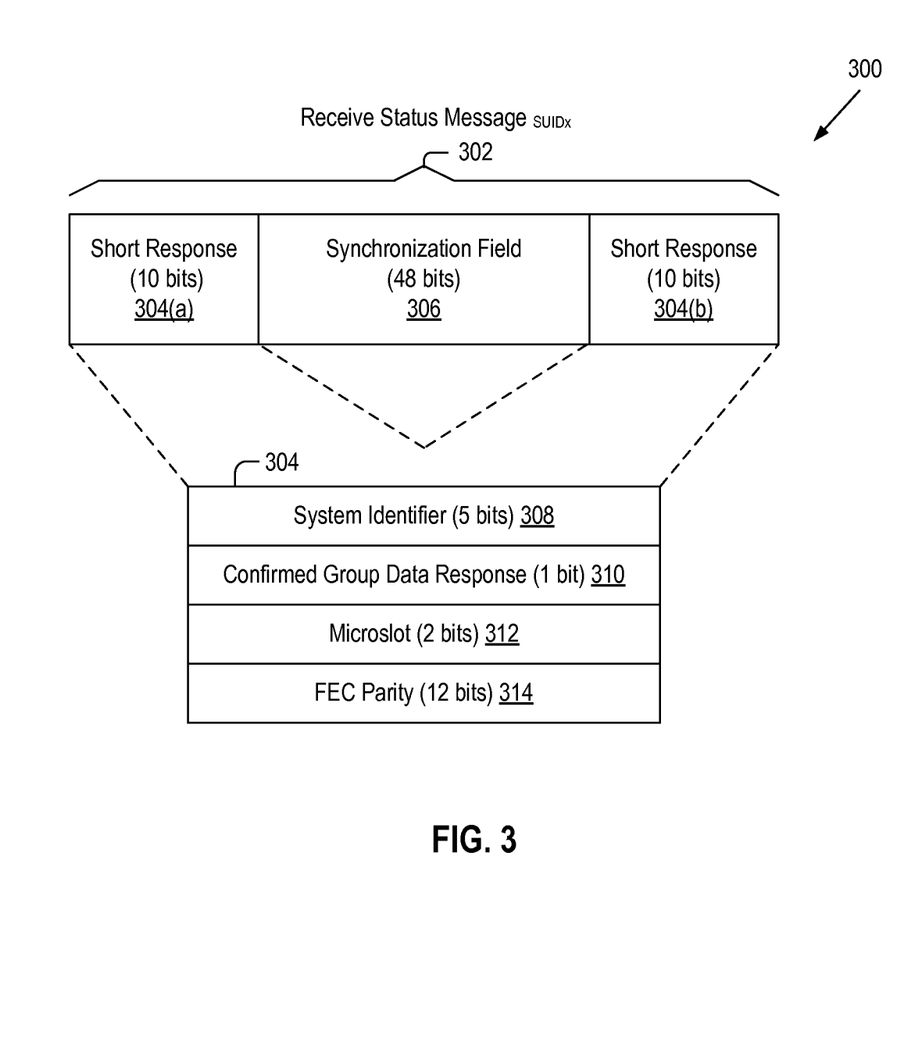
FIG. 3 is a simplified diagram of a receive status message sent from a radio subscriber unit to a base radio in accordance with some embodiments.

FIG. 3 is a simplified diagram of a data transmission 300 comprising an example receive status message 302 sent from an individual SU to a base radio in accordance with some embodiments. In operation, each SU in the talk group sends the base radio a separate receive status message in response to receiving an acknowledgement poll message from the base radio. The receive status message 302 that an individual SU transmits to the base radio may be either (i) an ACK message to indicate to the base radio that the SU successfully received each and every data block transmitted by the base radio during the data transmission period preceding the hangtime period during which the SU received the acknowledgement poll message; or (ii) a NACK message to indicate to the base radio that the SU did not successfully receive each and every data block transmitted by the base radio during the data transmission period preceding the hangtime period during which the SU received the acknowledgement poll message.

As described above, in some embodiments, an individual SU determines whether it successfully received each and every data block of a data transmission period by performing a CRC analysis on each received data block based at least in part on the error-detection data contained in the block CRC field of each received data block (FIG. 2). In other embodiments, an individual SU may perform a CRC analysis on multiple data blocks (or perhaps all data blocks) transmitted during a data transmission period based at least in part on error-detection contained in a message CRC. Regardless of whether the SU performs block-based or message-based error detection, if the SU determines that it received each and every data block during the preceding data transmission period without error, then the receive status message 302 that the SU sends to the base radio will be an ACK message. Conversely, if the SU determines that it received at least one of the data blocks during the preceding data transmission period with a transmission error(s), then the receive status message 302 that the SU sends to the base radio will be a NACK message.

In some embodiments, the base radio may encode data blocks with an error-correcting code prior to transmitting the data blocks to the SUs in the talk group, thereby enabling SUs to attempt to correct some transmission errors prior to conducting the above-described CRC analyses. In such embodiments, the base radio calculates a block CRC for the group data, inserts the calculated block CRC into the block CRC field 218, applies forward error correction (FEC) to the group data and block CRC, and transmits the data block to the SUs in the talk group. When an SU receives the data block, the SU uses FEC to attempt to correct transmission errors, and then uses the block CRC to detect block errors.

The example receive status message 302 shown in FIG. 3 includes a short response 304 that is broken into a first half 304(a) and a second half 304(b) separated by a synchronization field 306. In operation, the synchronization field 306 includes a synchronization pattern that the SU uses both for (i) transmission synchronization and (ii) to indicate ACK or NACK to the base radio.

In particular, the SU transmits the synchronization pattern in the synchronization field 306 to enable a receiver at the base radio to perform frame and/or symbol alignment on incoming transmissions so that the data within the 30-millisecond uplink timeslot can be extracted and decoded. The synchronization pattern is a distinctive bit sequence (sometimes referred to as a syncword) known by the receiver. As described in more detail below, in some embodiments, a 30-millisecond uplink timeslot may be sub-divided into 3 microslots to enable three separate SUs to each transmit a separate receive status message in a separate microslot within the single 30-millisecond uplink timeslot. In operation, the receiver at the base radio uses the known synchronization pattern in each receive status message in each microslot to symbol align each incoming receive status message. In some embodiments, the synchronization pattern may be a preamble at the beginning of a transmission or a midamble in the middle of a transmission.

As mentioned above, the SU also uses the synchronization pattern in the synchronization field 306 to indicate ACK or NACK to the base radio. In particular, the SU transmits a first synchronization pattern in the synchronization field 306 to indicate an ACK, or the SU transmits a second (different) synchronization pattern in the synchronization field 306 to indicate a NACK. In some embodiments, the first and second synchronization patterns may be "sync pairs," or complements of each other, meaning that the bits or symbols of the first synchronization pattern are the opposite of the bits or symbols of the second synchronization pattern, thereby resulting in a low degree of falsing. Using either bit-wise or symbol-wise complementary first and second synchronization patterns may also enable the receiver at the base radio to use a single matching algorithm to detect both the first and second synchronization patterns. Alternatively, the first and second synchronization patterns may be sufficiently uncorrelated (but perhaps not complementary) such that the receiver at the base radio can reliably differentiate between the first and second synchronization patterns.

In operation, if the SU has successfully received each and every data block in the preceding data transmission period, then the SU will insert the first synchronization pattern into the synchronization field 306 of the receive status message 302 that it sends to the base radio. The first synchronization pattern indicates an ACK, i.e., a confirmation to the base radio that the SU successfully received each and every data block in the preceding data transmission period. But if the SU did not successfully receive each and every data block in the preceding data transmission period, the SU will insert the second synchronization pattern into the synchronization field 306 of the receive status message 302 that it sends to the base radio. This second synchronization pattern indicates a NACK, i.e., an indication to the base radio that the SU did not successfully receive each and every data block in the preceding data transmission period.

As mentioned earlier, an SU may determine whether it has successfully received each and every data block in a preceding data transmission period by multiple methods. For example, in some embodiments, the SU may analyze the block CRC in each received data message to determine, on a block-by-block basis, whether it successfully received each data block during the data transmission period. In other embodiments, the SU may additionally or alternatively analyze a message CRC corresponding to all of the data blocks sent during the preceding data transmission period to determine whether it received each and every data block transmitted by the base radio during the preceding data transmission period.

Because the SUs must transmit a synchronization pattern to enable the receiver at the base radio to decode the receive status message, and because the first and second synchronization patterns are known and can be differentiated by the receiver at the base radio, the SUs in the talk group can use the first and second synchronization patterns to indicate ACK and NACK without having to transmit any additional bits beyond the bits in the synchronization pattern that they already must send anyway. Thus, by using the first and second synchronization patterns for both transmission synchronization and to indicate ACK and NACK, for example at a Layer 2 of the Open Systems Interconnection (OSI) model, the disclosed embodiments reduce the bandwidth required for SUs to indicate ACK and NACK to the base radio as compared to alternative methods where SUs might use bits that are are separate and distinct from the bits in the synchronization pattern to indicate ACK or NACK to the base radio.

The receive status message 302 also includes a short response 304. In some embodiments, the short response 304 may include one or more of (i) a system identification field, (ii) a confirmed group data response field, (iii) a microslot field, and/or (iv) a FEC parity field. In the example receive status message 302 shown in FIG. 3, the short response 304 includes a system identifier field 308, a confirmed group data response field 310, a microslot field 312, and a FEC parity field 314.

The system identifier field 308 contains a system identifier (system ID) that may identify the particular network that the transmitting SU is configured to operate on and/or the transmitting SU's talk group.

Embodiments that include a group data response field may utilize the group data response field to transmit an additional ACK or NACK indication to the base radio. In embodiments like the example shown in FIG. 3, the SU can use the group data response field 310, which is separate from the synchronization field 306 in the receive status message 302, to additionally indicate whether the SU successfully received each and every data block transmitted during the preceding data transmission period. As mentioned earlier, the SU may determine whether it received each and every data block transmitted during the preceding data transmission period by (i) analyzing the block CRC in each data block received during the preceding transmission period and/or (ii) analyzing a message CRC for all of the data blocks transmitted by the base radio during the preceding data transmission period. If the SU determines that it successfully received each and every data block, then the SU inserts an ACK indication into the confirmed group data response field 310. But if the SU determines that it did not successfully receive each and every data block in the preceding data transmission period, then the SU inserts a NACK indication into the confirmed group data response field 310.

By indicating ACK or NACK in two parts of the receive status message 302 (i.e., in the synchronization field 306 and the confirmed group data response field 310), an SU can enable the base radio to perform a form of error-detection and more reliably determine ACK or NACK to prevent or at least help reduce instances of falsing (i.e., a scenario where a weak signal or data transmission error(s) causes the base radio to decode a NACK as an ACK or vice versa) than if the SU indicated ACK or NACK in only one field of the receive status message 302. This capability can be useful in embodiments such as the example shown in FIG. 3, where the receive status message 302 does not include a CRC field for error detection. Moreover, the system can achieve this improved reliability with as little as a single bit, i.e., the 1-bit confirmed group data response field 310 (although some embodiments may use a group data response field larger than 1 bit to convey more than ACK and NACK). In particular, the base radio can examine both (i) the synchronization pattern within the synchronization field 306 and (ii) the indication in the confirmed group data response field 310. If the synchronization pattern indicates an ACK and the confirmed group data response also indicates an ACK, then the base radio can be fairly confident that it received an ACK from an SU. Likewise, if the synchronization pattern indicates a NACK and the confirmed group data response also indicates a NACK, the base radio can be fairly confident that it received a NACK from an SU.

Further, some embodiments may additionally use the system ID contained in the system identifier field 308 to aid in error-detection. For example, in ETSI DMR embodiments, each receive status message that each SU in a talk group transmits to a base radio includes the same system ID in the system identifier field 308. Because the receiver at the base radio knows what the system ID for each receive status message should be, the receiver can use a combination of the system ID in the system identifier field 308, the synchronization pattern in the synchronization field 306, and the ACK/NACK indication in the group data response field 310 to improve its level of confidence in the accuracy of a receive status message received from an SU.

In some embodiments, the base radio may first check to determine if the system ID in the system identifier field 308 matches the expected system ID. If the system ID in the system identifier field 308 does not match the expected system ID, the base radio may discard the message as either erroneous or perhaps intended for another receiver. But if the system ID in the system identifier field 308 matches the expected system ID, then the base radio may then determine (i) whether the group data response field 310 indicates an ACK or a NACK, (ii) whether the synchronization pattern in the synchronization field 306 indicates an ACK or a NACK, and (iii) whether the receive status (ACK or NACK) indicated by the data in the group data response field 310 matches the receive status (ACK or NACK) indicated by the synchronization pattern in the synchronization field 306. If the receive status indicated in the group data response field 310 matches the receive status indicated by the synchronization pattern, then the base radio may conclude that it successfully received the receive status message. But if the receive status indicated in the group data response field 310 does not match the receive status indicated by the synchronization pattern, then the base radio may discard the receive status message as erroneous. In this manner, the base radio can additionally use the system ID in the system identifier field 308 to prevent or at least help reduce instances of falsing.

In some embodiments, the receive status message may also include a FEC parity field 314 that includes error-correcting code that the base radio can use to detect and perhaps correct errors in a particular receive status message that is received from an individual SU.

Some embodiments may also include a microslot field 312 that indicates one of a plurality of microslots during which the SU transmitted the receive status message 302. As described with reference to FIG. 2, the base radio transmits data blocks and acknowledgement poll messages in 30-millisecond timeslots that include up to 288 bits of data at a 9.6 Kbps data rate. In some embodiments, transmissions from SUs to the base radio are also arranged in 30-millisecond timeslots that may include up to 288 bits of data at a 9.6 Kbps data rate.

In such embodiments, three separate 68-bit long (7.083 milliseconds at a 9.6 Kpbs data rate) receive status messages like receive status message 302 can be transmitted by three separate SUs during one 30-millisecond timeslot. And in such embodiments, the microslot field 312 may indicate which of the three microslots within the 30-millisecond timeslot that the SU transmitted the receive status message. Indicating which of the three microslots within a particular uplink timeslot that the SU transmitted the receive status message may help the base radio determine which SU transmitted the receive status message because, in operation, each SU will transmit its receive status message in one of three microslots as indicated by the earlier acknowledgement poll message that the base radio sent to the SU (see FIG. 2).

Because three SUs can send a reliable receive status message during a single 30-millisecond uplink timeslot, all of the SUs in a large talk group with 90 SUs for example can transmit their receive status messages during thirty total 30-millisecond uplink timeslots. As a result, the receive status message format described herein enables all of the SUs in a talk group to separately confirm receipt of group data substantially faster (up to 3-times faster) than methods where each SU in the talk group sends a receive status message in a separate 30-millisecond uplink timeslot.

Additionally, in some embodiments, an SU may use different combinations of synchronization patterns (or perhaps "sync pairs" or combinations of "sync pairs") to indicate ACK or NACK depending on which microslot the SU is scheduled to transmit its receive status message to the base radio. For example, if a particular SU is scheduled to transmit its receive status message during the first of three microslots, then the SU may use the first synchronization pattern to indicate an ACK and the second synchronization pattern to indicate a NACK. But if the SU is scheduled to transmit its receive status message during the second of the three microslots, then the SU may instead use the second synchronization pattern to indicate an ACK and the first synchronization pattern to indicate a NACK.

Alternatively, if four synchronization patterns are available for use in indicating ACK or NACK, an SU may (i) use synchronization pattern 1 for ACK and synchronization pattern 2 for NACK if transmitting its receive status message during the first microslot; (ii) use synchronization pattern 3 for ACK and synchronization pattern 4 for NACK if transmitting its receive status message during the second microslot; and (iii) use synchronization pattern 2 for ACK and synchronization pattern 1 for NACK if transmitting its receive status message during the third microslot. Similarly, if three sync pairs (i.e., 6 total synchronization patterns) are available for use in indicating ACK or NACK, an SU may (i) use the first synchronization pattern of sync pair 1 for ACK and the second synchronization pattern of sync pair 1 for NACK if transmitting its receive status message during the first microslot; (ii) use the first synchronization pattern of sync pair 2 for ACK and the second synchronization pattern of sync pair 2 for NACK if transmitting its receive status message during the second microslot; and (iii) use the first synchronization pattern of sync pair 3 for ACK and the second synchronization pattern of sync pair 3 for NACK if transmitting its receive status message during the third microslot. Other combinations of synchronization patterns, sync pairs, and combinations of synchronization patterns and/or sync pairs for ACK and NACK could be used as well. In this manner, the base radio is able to use the microslot identified in field 312 of the receive status message 302 along with the confirmed group data response in field 310 and the synchronization pattern in field 306 to help determine whether an individual receive status message was received with or without one or more errors.

If the base radio receives a NACK indication from any of the SUs in the talk group, the base radio may then re-transmit some or all of the data blocks to some or perhaps all of the SUs in the talk group.

Figure 4:
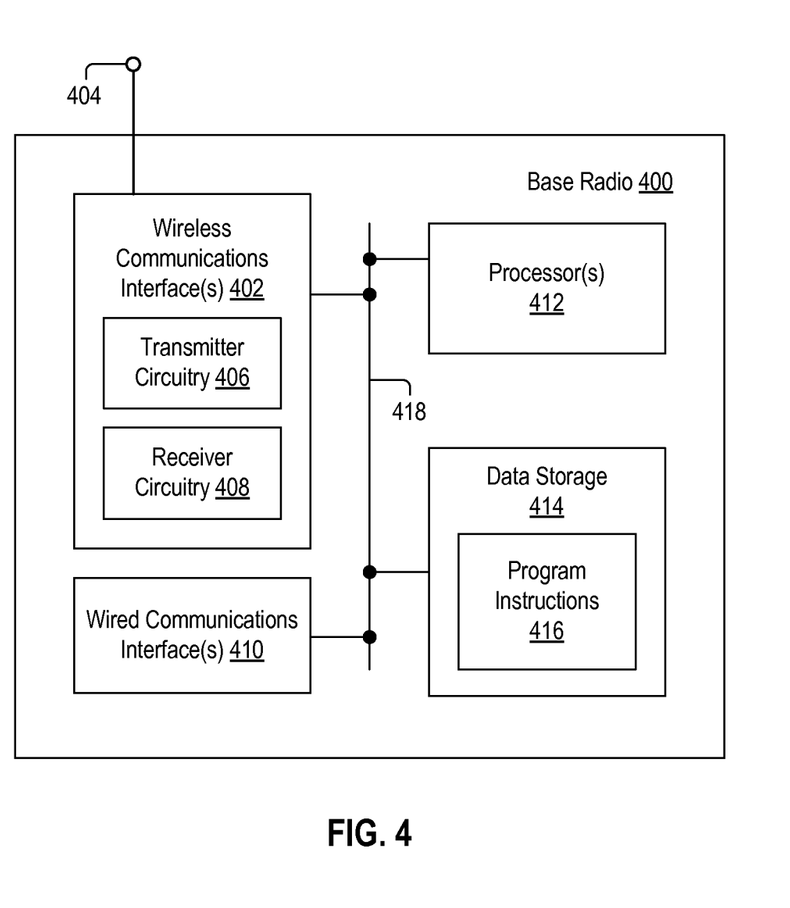
FIG. 4 is a simplified block diagram of a base radio in accordance with some embodiments.

FIG. 4 is a simplified block diagram of a base radio 400 in accordance with some embodiments. The base radio 400 is configured to operate in a wireless network such as wireless network 100 shown and described with reference to FIG. 1. In operation, the base radio 400 may be the same as or similar to base radio 102 shown or described with reference to FIG. 1.

The example base radio 400 includes one or more wireless communications interfaces 402, one or more wired communications interfaces 410, one or more processors 412, and data storage 414, all of which may be coupled together by a system bus 418 or similar mechanism. In addition, the base radio 400 may also include external storage, such as magnetic or optical disk storage (not shown). Variations from this arrangement are possible as well, including addition and/or omission of components, combination of components, and distribution of components in any of a variety of ways.

The base radio 400 components may be arranged to support wireless communications in a wireless network that is compliant with one or more of the variety of wireless air-interface protocols noted herein, in addition to other protocols now known or later developed. In particular, the components of the example base radio 400 are configured to implement some aspects of time-efficient group data acknowledgement in accordance with the example embodiments described herein. For example, base radio 400 may be configured to generate and send downlink data transmissions to a plurality of SUs on a shared communication channel, including but not limited to data transmissions that are the same as or similar to data flow 200 shown and described with reference to FIG. 2 and similar data transmissions. Additionally, the base radio 400 may also be configured to receive and process uplink data transmissions from SUs to the base radio on a shared communications channel, including but not limited to data transmissions that are the same as or similar to the receive status messages shown and described with reference to FIG. 3 and similar data transmissions.

The one or more wireless communications interfaces 402 include one or more antennas 404, transmitter circuitry 406, receiver circuitry 408, and other associated components that enable the base radio 400 to engage in air interface communication with one or more SUs, such as SUs $104_1$-$104_m$ shown in FIG. 1, according to any of the air interface protocols disclosed and/or described herein. In some instances, the transmitter circuitry 406 and receiver circuitry 408 (alone or in combination with the antenna(s) 404) may be collectively referred to as transceiver circuitry.

The one or more wired communications interfaces 410 include physical network interfaces (e.g., optical, electrical) that enable the base radio 400 to send and receive data transmissions directly or indirectly to/from other base radios and additionally or alternatively to/from one or more local area networks (LAN), wide area networks (WAN), or other networks, such as the Public Switched Telephone Network (PSTN), or the Internet. The one or more wired communications interfaces 418 may take the form of Ethernet network interfaces, optical network interfaces, or other physical interfaces to one or more networks that directly or indirectly connect the base radio 400 to other base radios as well as to LANs, WANs, or other networks such as the PSTN or the Internet. The one or more wired communications interfaces 410 may also enable the base radio 400 to be controlled by one or more wireless network controllers and/or other network control and management systems.

The one or more processors 412 include one or more general-purpose processors (e.g., microprocessors) and/or one or more special-purpose processors (e.g., digital signal processors (DSPs) or application specific integrated circuits (ASICs)).

The non-transitory data storage 414 includes one or more volatile and/or non-volatile storage components, such as magnetic or optical memory or disk storage. Non-transitory data storage 414 can be integrated in whole or in part with the one or more processors 412, as cache memory or registers for example. In some embodiments, one or more of the processors 412 and non-transitory data storage 414 may be integrated in whole or in part with one or more of the wireless communications interfaces 402 and/or wired communications interfaces 410.

In operation, the non-transitory data storage 412 is configured to hold program instructions 416. The program instructions 416 include machine language instructions that define routines and software program code executable by the one or more processors 412 (alone or in combination with the wireless communications interface(s) 402 and/or wired communications interface(s) 410) to implement and/or execute various features and functions described in the embodiments disclosed herein. For example, the one or more processors 412 of the base radio 400 may execute the program instructions 416 in data storage 414 to cause the base radio 400 to generate, send, receive, and/or process the data transmissions associated with time-efficient group data acknowledgement processes and procedures described herein, including but not limited to those steps, receptions, and/or transmissions set forth in FIGS. 2, 3, and/or 6.

Figure 5:
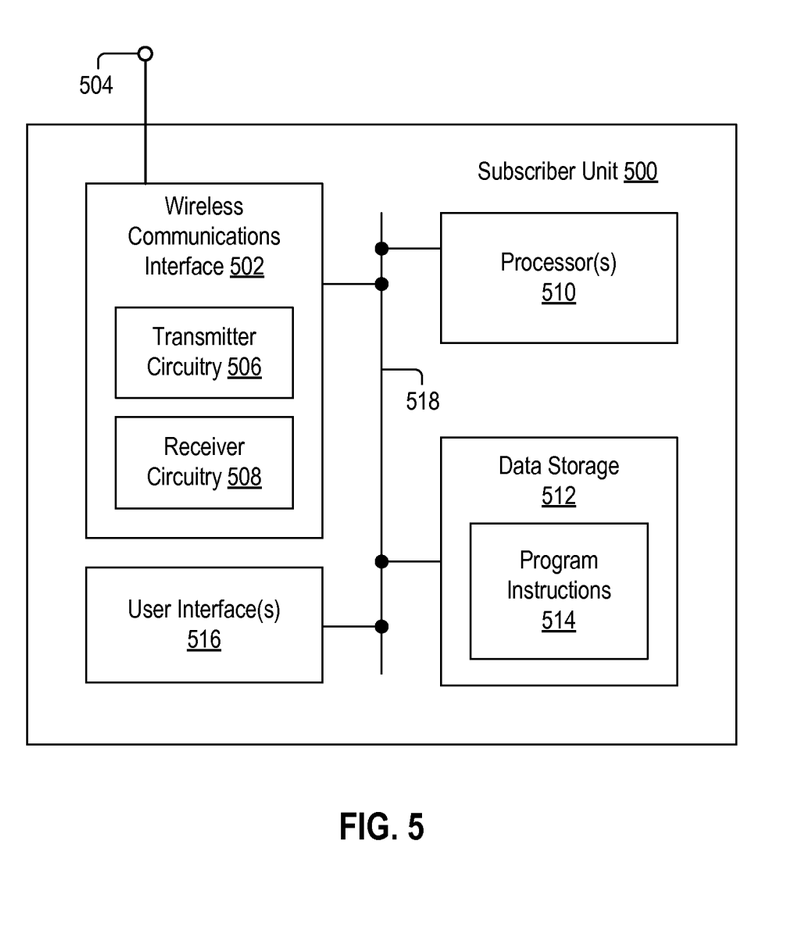
FIG. 5 is a simplified block diagram of a radio subscriber unit in accordance with some embodiments.

FIG. 5 is a simplified block diagram of a radio subscriber unit (SU) 500 in accordance with some embodiments. The SU 500 is configured to operate in a wireless communications network such as network 100 shown and described with reference to FIG. 1. Similarly, the SU 500 may be the same as or similar to SUs 104₁-104ₘ shown and described with reference to FIG. 1.

The example SU 500 includes one or more wireless communications interfaces 502, one or more user interfaces 516, one or more processors 510, data storage 512, all of which may be coupled together by a system bus 518 or similar mechanism. Variations from this arrangement are possible as well, including addition and/or omission of components, combination of components, and distribution of components in any of a variety of ways.

The SU 500 components may be arranged to support wireless communications in a wireless communication network that is compliant with one or more of the variety of wireless air-interface protocols noted herein, in addition to other protocols now known or later developed. In particular, the components of the example SU 500 are configured to implement some aspects of time-efficient group data acknowledgement in accordance with the example embodiments described herein. For example, SU 500 is configured to receive and process downlink data transmissions from a base radio on a shared communication channel, including but not limited to data transmissions that are the same as or similar to data flow 200 shown and described with reference to FIG. 2 and similar data transmissions. Additionally, the SU 500 may be configured to generate and send uplink data transmissions to the base radio on a shared communications channel, including but not limited to data transmissions that are the same as or similar to the receive status messages shown and described with reference to FIG. 3 and similar data transmissions The one or more wireless communications interfaces 502 include one or more antennas 504, transmitter circuitry 506, receiver circuitry 508, and other associated components that enable the SU 500 to engage in air interface communication with a base radio, such as base radio 102 shown in FIG. 1 or the base radio 400 shown in FIG. 4, according to any of the air interface protocols disclosed and/or described herein. In some instances, the transmitter circuitry 506 and receiver circuitry 508 (alone or in combination with the antenna(s) 504) may be collectively referred to as transceiver circuitry.

The one or more processors 510 include one or more general purpose processors (e.g., microprocessors) and/or special purpose processors (e.g., DSPs, ASICs). In some embodiments, the one or more processors 510 may be integrated in whole or in part with the one or more wireless communications interfaces 502.

The non-transitory, computer-readable data storage 512 comprises one or more volatile and/or non-volatile storage components. The storage components may include one or more magnetic, optical, and/or flash memory components for example. In some embodiments, the non-transitory data storage 512 may be integrated in whole or in part with the one or more processors 510 and/or the wireless communication interface(s) 502. Additionally or alternatively, the non-transitory data storage 512 may be provided separately as a non-transitory machine or computer readable medium.

The non-transitory data storage 512 may hold (e.g., contain, store, or otherwise be encoded with) program instructions 514 (e.g., machine language instructions or other program logic, markup or the like) executable by the one or more processors 510 to execute the various functions described herein, including but not limited to those steps, receptions, and/or transmissions set forth in FIGS. 2, 3, and/or 6.

The user interface(s) 516 may include a screen or touchscreen (e.g., a Liquid Crystal Display (LCD) or similar type of screen or touchscreen) on which a user may (i) view data (e.g., group data like text messages, system alarms, or the like) and/or (ii) input data SU for (ii-a) controlling and/or configuring the SU and/or (ii-b) transmitting over the wireless network. The user interface(s) 516 may also include a set of buttons arranged in a keypad or similar layout via which a user may input data to the SU for (i) controlling and/or configuring the SU and/or (ii) transmitting over the wireless network.

Figure 6:
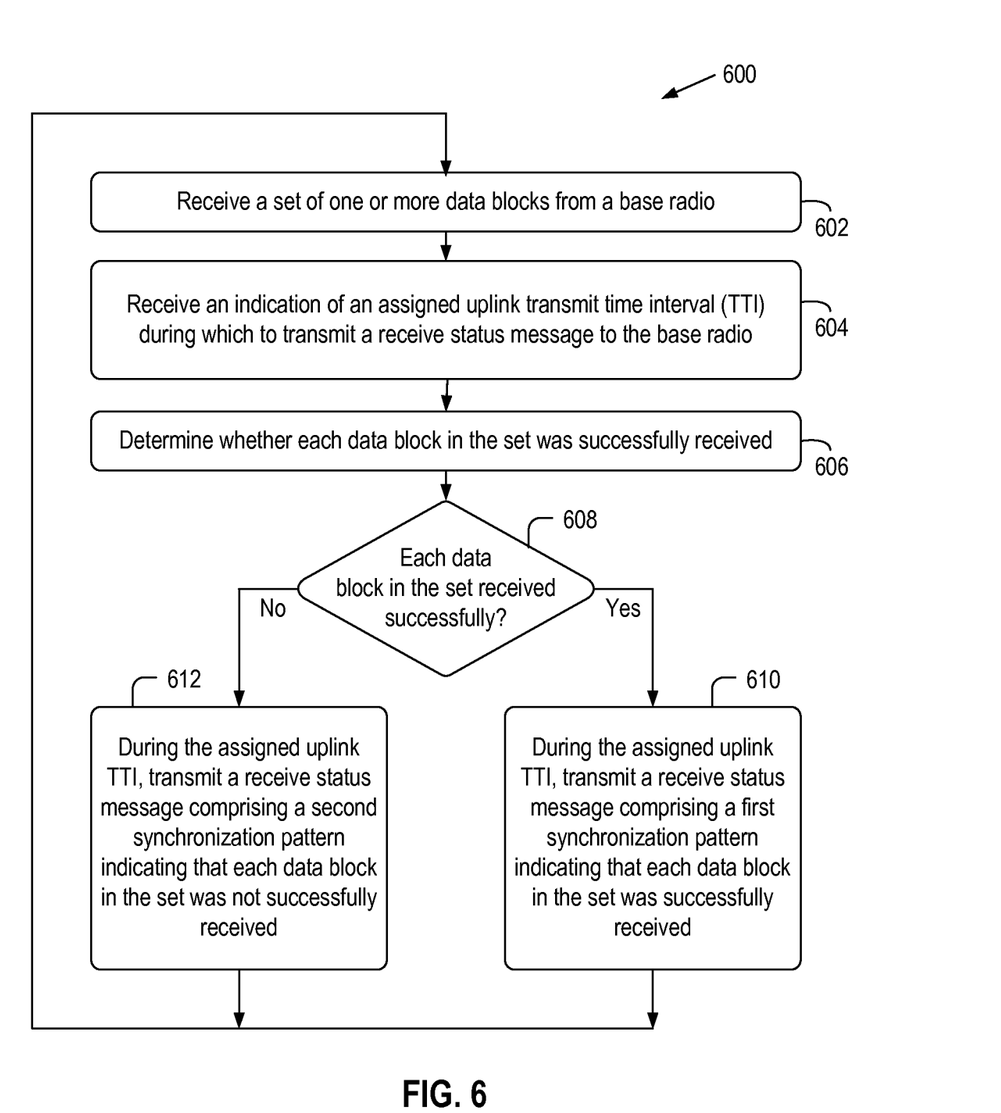
FIG. 6 is a flowchart of a method of group data receipt acknowledgement in accordance with some embodiments.

FIG. 6 is a flowchart of a method 600 of group data receipt acknowledgement in accordance with some embodiments.

Method 600 begins at step 602 where an SU receives a set of one or more data blocks from a base radio. The SU and the base radio may be the same as or similar to any of the SUs or base radios shown or described herein. In operation, the SU is one of a plurality of SUs in a talk group, and the set of one or more data blocks is transmitted by the base radio to the plurality of SUs in the talk group during a data transmission period that is similar to or the same as data transmission period 202 shown and described with reference to FIG. 2.

In some embodiments, step 602 also includes the SU determining, for each data block that it receives (and perhaps on a block-by-block basis as each data block is received), whether the SU successfully received that particular data block. For example, the SU may perform error detection based on an analysis of CRC data contained within a block CRC field of each received data block as described herein with reference to FIGS. 2 and 3. But in some embodiments, the SU may additionally or alternatively perform error detection based on an analysis of CRC data contained within a message CRC applicable to multiple data blocks (or perhaps all the data blocks) transmitted during a single data transmission period. Successful receipt includes either or both of (i) for systems that employ forward error correction, detecting and correcting errors in a data block that was received with one or more errors and/or (ii) receiving the data block without an error. In operation, determining successful receipt of an individual data block may include a combination of error-correction methods alone or in combination with error-detection methods as shown and described herein with reference to FIGS. 2 and 3.

At step 604, the SU receives an indication of an assigned uplink transmit time interval (TTI) during which to transmit a receive status message to the base radio. In some embodiments, the indication of the assigned TTI is contained within one of a plurality of acknowledgement polling messages that the base radio sends to the plurality of SUs in the talk group during a hangtime period following a data transmission period, such as the hangtime period 204 following the data transmission period 202 shown and described with reference to FIG. 2. Similarly, in some embodiments, the acknowledgement polling messages directed to individual SUs are the same as or similar to the acknowledgement polling messages shown and described with reference to FIG. 2. Likewise, the assigned uplink TTI may be a single uplink timeslot or one of a plurality of microslots contained within a single uplink timeslot as shown and described herein with reference to FIGS. 2 and 3.

At step 606, the SU determines whether it successfully received each and every data block in the set of one or more data blocks received at step 602. In embodiments where step 602 includes the SU detecting errors on a block-by-block basis as each data block is received, step 606 may include the SU referring back to the outcome of the error detection analysis conducted for each of the data blocks in the set of one or more data blocks received at step 602. In other embodiments, the SU may wait to receive some or all of the data blocks before performing error-detection on the received data blocks and making any subsequent determination of whether each and every data block was successfully received. Some embodiments may additionally or alternatively include the SU performing an error-detection analysis on a set of multiple (or perhaps all) data blocks received during a transmission period based on a message CRC as described herein. As mentioned previously, successful receipt may include (i) for systems configured to employ forward error correction, detecting and correcting errors in a data block that was received with one or more errors and/or (ii) receiving the data block without an error.

At step 608, if the SU has determined that each and every data block in the set of one or more data blocks received from the base radio in step 602 was successfully received, then method 600 advances to step 610, where the SU (i) generates a receive status message comprising a first synchronization pattern indicating that each data block in the set of one or more data blocks received from the base radio in step 602 was received successfully and (ii) transmits the generated receive status message to the base radio during the assigned uplink TTI received in step 604.

But if at step 608, the SU determines that each and every data block in the set of one or more data blocks received from the base radio in step 602 was not successfully received, then method 600 advances to step 612, where the SU (i) generates a receive status message comprising a second synchronization pattern indicating that each data block in the set of one or more data blocks received from the base radio in step 602 was not received successfully and (ii) transmits the generated receive status message to the base radio during the assigned uplink TTI received in step 604. In operation, the assigned TTI during which the SU transmits the generated receive status message may be a single uplink timeslot or one of a plurality of microslots contained within a single uplink timeslot as shown and described herein with reference to FIGS. 2 and 3.

In operation, the receive status message generated and sent at steps 610 or 612 may be the same as or similar to the receive status messages shown and described with reference to FIG. 3. For example, in some embodiments, the receive status messages generated and sent at steps 610 or 612 may additionally include one or more of a system identifier, confirmed group data response indication, a microslot indication, and/or FEC parity data as shown and described with reference to FIG. 3.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method comprising:
    receiving at a radio subscriber unit (SU), a set of one or more data blocks from a base radio;
    receiving at the SU, an indication of a designated uplink transmit time interval (TTI) during which the SU is scheduled to transmit a receive status message to the base radio;
    determining by the SU, whether the SU has successfully received each data block in the set of one or more data blocks; and
    when the determining by the SU is that the SU has successfully received each of the one or more data blocks:
        the SU transmitting a receive status message during the designated uplink TTI to the base radio, wherein the receive status message comprises both of (i) a first synchronization pattern indicating that the SU successfully received each data block in the set of the one or more data blocks and (ii) a first group data receive status indicator field separate from the first synchronization pattern, wherein the first group data receive status indicator field also indicates that the SU successfully received each data block in the set of the one or more data blocks; and
    when the determining by the SU is that the SU has not successfully received each of the one or more data blocks:
        the SU transmitting a receive status message during the designated uplink TTI to the base radio, wherein the receive status message comprises both of (i) a second synchronization pattern different from the first synchronization pattern indicating that the SU did not successfully receive each data block in the set of the one or more data blocks and (ii) a first group data receive status indicator field separate from the first synchronization pattern, wherein the first group data receive status indicator field also indicates that the SU did not successfully receive each data block in the set of the one or more data blocks.

2. The method of claim 1, wherein the first synchronization pattern is either complementary to the second synchronization pattern or uncorrelated with the second synchronization pattern.

3. The method of claim 1, wherein the SU determining whether the SU has successfully received each data block in the set of one or more data blocks comprises one or both of (i) the SU analyzing a block cyclic redundancy check (CRC) in each data block of the set of one or more blocks and/or (ii) the SU analyzing a message CRC for the set of one or more data blocks.

4. The method of claim 1, wherein successful receipt comprises one or both of (i) the SU receiving each data block without an error or (ii) the SU successfully correcting all detected errors in each data block received with one or more errors.

5. The method of claim 1, wherein the assigned uplink TTI is one of (i) a single uplink timeslot or (ii) one of a plurality of microslots contained within a single uplink timeslot.

6. The method of claim 5, wherein the receive status message further comprises a microslot field that indicates a microslot of an uplink timeslot during which the SU transmitted the receive status message to the base radio.

7. The method of claim 1, wherein the receive status message further comprises (i) a system identification field comprising system identification information and (ii) a parity field comprising error-correction code.

8. A radio subscriber unit (SU) comprising:
    one or more wireless communications interfaces configured to receive (i) a set of one or more data blocks from a base radio and (ii) an indication of a designated uplink transmit time interval (TTI) during which the SU is scheduled to transmit a receive status message to the base radio; and
    one or more processors configured to: (i)
        determine whether the SU has successfully received each of the one or more data blocks;
        when the determining is that the SU has successfully received each of the one or more data blocks:
            generate and transmit, via the one or more wireless communications interfaces during the designated uplink TTI to the base radio, a receive status message comprising both of (i) a first synchronization pattern indicating that the SU successfully received each data block in the set of the one or more data blocks and (ii) a first group data receive status indicator field separate from the first synchronization pattern, wherein the first group data receive status indicator field also indicates that the SU successfully received each data block in the set of the one or more data blocks; and when the determining is that the SU has not successfully received each of the one or more data blocks:
generate and transmit, via the one or more wireless communications interfaces during the designated uplink TTI to the base radio, a receive status message comprising both of (i) a second synchronization pattern different from the first synchronization pattern indicating that the SU did not successfully receive each data block in the set of the one or more data blocks and (ii) a first group data receive status indicator field separate from the first synchronization pattern, wherein the first group data receive status indicator field also indicates that the SU did not successfully receive each data block in the set of the one or more data blocks.

9. The radio SU of claim 8, wherein the first synchronization pattern is either complementary to the second synchronization pattern or uncorrelated with the second synchronization pattern.

10. The radio SU of claim 8, wherein the one or more processors are configured to determine whether the SU has successfully received each of the one or more data blocks by one or both of (i) analyzing a block cyclic redundancy check (CRC) in each data block of the one or more blocks, and/or (ii) analyzing a message CRC for the one or more data blocks.

11. The radio SU of claim 8, wherein the assigned uplink TTI is one of (i) a single uplink timeslot or (ii) one of a plurality of microslots contained within a single uplink timeslot.

12. The radio SU of claim 11, wherein the receive status message further comprises a microslot field that indicates a microslot of an uplink timeslot during which the SU transmitted the receive status message to the base radio.

13. The radio SU of claim 8, wherein the receive status message further comprises (i) a system identification field comprising system identification information and (ii) a parity field comprising error-correction code.

14. A tangible, non-transitory computer-readable data storage comprising instructions that, when executed by one or more processors of a radio subscriber unit (SU), cause the SU to perform a method comprising:
receiving a set of one or more data blocks from a base radio;
receiving an indication of a designated uplink transmit time interval (TTI) from the base radio, during which the SU is scheduled to transmit a receive status message to the base radio;
determining whether the SU has successfully received every one of the one or more data blocks;
when the determining is that the SU has successfully received every data block in the set of the one or more data blocks:
generating a receive status message comprising both of (i) a first synchronization pattern indicating that the SU successfully received every data block in the set of the one or more data blocks and (ii) a first group data receive status indicator field separate from the first synchronization pattern, wherein the first group data receive status indicator field also indicates that the SU successfully received each data block in the set of the one or more data blocks;
when the determining is that the SU has not successfully received every data block in the set of the one or more data blocks:
generating a receive status message comprising both of (i) a second synchronization pattern indicating that the SU has not successfully received every data block in the set of the one or more data blocks and (ii) a first group data receive status indicator field separate from the first synchronization pattern, wherein the first group data receive status indicator field also indicates that the SU did not successfully receive each data block in the set of the one or more data blocks; and
initiating the transmission of the generated receive status message to the base radio during the designated uplink TTI.

* * * * *